United States Patent Office 3,733,269
Patented May 15, 1973

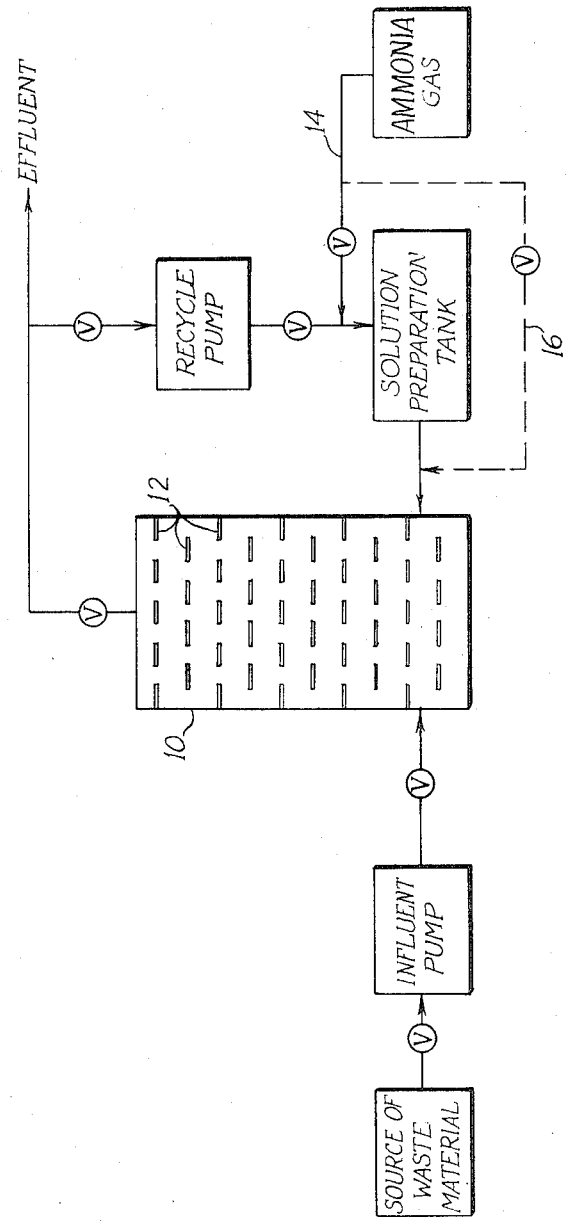

3,733,269
PROCESS FOR COAGULATING AND AGGLOMERATING PARTICULATE MATERIAL WITHIN A LIQUID MEDIA
Jan W. Gooch, Russellville, Ark., assignor to Paul Paladino and John H. Haley, Russellville, Ark., fractional part interest to each
Continuation-in-part of application Ser. No. 781,840, Dec. 6, 1968, now Patent No. 3,586,627, which is a continuation-in-part of application Ser. No. 757,224, Aug. 30, 1968, which in turn is a continuation-in-part of application Ser. No. 696,537, Jan. 9, 1968. This application Aug. 31, 1970, Ser. No. 68,399
Int. Cl. B01d 21/01
U.S. Cl. 210—47
10 Claims

ABSTRACT OF THE DISCLOSURE

A waste extraction process for agglomerating, coagulating and extracting suspended solids and organic waste materials such as found in the waste effluent streams of packing and rendering plants, paper and pulp mills, food processing plants, wood preserving plants, rice processing plants, and similar facilities. In one embodiment of the invention, the process comprises introducing a reagent solution into the waste stream in such a manner that the reagent is released and dispersed within the waste stream in the form of a microscopically gaseous phase which is adsorbed on the surfaces of the suspended solids and organic waste materials to react with the surfaces of the solids and materials and produce surface characteristics which induce agglomeration and coagulation of the solids and materials.

CROSS-REFERENCE TO RELATED APPLICATIONS

This application is a continuation-in-part of my previously filed copending application Ser. No. 781,840 filed Dec. 6, 1968 and entitled "Process for Agglomerating and Coagulating Waste Material," now U.S. Pat. No. 3,586,627, which was a continuation-in-part of my previously filed copending application Ser. No. 757,224, filed Aug. 30, 1968 and entitled "Improved Extraction Process," now abandoned, which was in turn a continuation-in-part of my previously filed copending application Ser. No. 696,537, filed Jan. 9, 1968, and entitled "Extraction Process," now abandoned.

This invention relates to the agglomeration, coagulation and extraction of suspended solids and organic waste materials from various plant and mill effluent streams. More particularly the invention concerns the generation of dispersed microscopic bubbles of a reagent within a waste material effluent stream so that the reagent may selectively react with the surfaces of suspended solids and waste materials to induce agglomeration and coagulation thereof.

An ever increasing problem has been created by the continued and expanding pollution of streams, rivers, lakes and by-waters. In each instance a plant or mill generates by-product material, organic waste material or conventional sewage during its operation and typically removes the undesirable material by dissolving or dispersing it in a water solution which is flowed as a waste effluent stream to a convenient disposal point such as a stream, river, lake or by-water. Major efforts have been exerted in the past to reduce the degree and extent of pollution caused by these waste effluent streams. Mechanical separation such as skimming, settling, centrifuging and filtering have been successful in removing large undissolved particles. A large amount of dispersed or dissolved solid material or organic waste material of a density approximately equal to that of the carrying solution still remains within the effluent stream, however, after mechanical separation is completed. Various chemical treatments have been proposed to remove the remaining solid or organic waste material. These treatments, though, suffer and have suffered from many disadvantages among which are excessive cost of treating materials and associated equipment; slowness of separation of treated waste material with consequent need for costly treating and settling tanks or basins of large size; inefficiency in removal of very finely divided, suspended and in particular the coagulable or absorbable dissolved solids; and relatively low purity of treated water obtained from the treatment process. These major disadvantages of the conventional chemical methods of treating sewage have prevented the widespread commercial use of such methods, despite the fact that chemical treatment of sewage offers the possibiilty of very large savings of capital costs in the construction of sewage treatment plants in return for a very small daily outlay for the costs of the necessary treating chemicals.

Therefore it is an object of the present invention to provide an economical and efficient process for agglomeration, coagulation and extraction of solids and waste materials from a plant or mill waste effluent stream. Other objects, features, and advantages of the invention will become apparent from a review of the following detailed description of an embodiment of the invention and the accompanying drawing wherein FIG. 1 schematically represents one process of the invention.

In accordance with the present invention, suspended solids and inorganic and organic waste materials are agglomerated, coagulated and extracted from waste effluent streams of packing and rendering plants, paper and pulp mills, food processing plants, wood preserving plants, rice processing plants and other similar mills or industrial facilities. Typical waste materials include those which are generally organic in nature such as wood and wood fibers, animal and vegetable tissues including oils, fibers, blood, saccharides, urea, carbohydrates, fats, sugars, fatty acids, cellulose, dyes, and other similar material. Also typically found within a waste effluent stream are human and animal excrement, hard and soft garbage, animal and vegetable organisms, and other biological and mineral products. Those portions of the waste material which exceed the density of the liquid component of the waste stream by a large degree will quickly settle out and may be removed by conventional mechanical separation techniques. In addition, those portions of the waste material which are lighter to a large degree than the liquid component of the waste stream will float to the surface of the stream and may also be easily removed by mechanical separation techniques.

After removal of that portion of the waste material which may be easily removed by mechanical techniques, there remains a large amount of finely divided dispersed, suspended or emulsified waste material of a density closely approximating the density of the liquid component of the stream, usually a water solution. The finely divided material may be economically and efficiently removed from the liquid component by the process of the present invention.

In one embodiment of the invention, a reagent solution is prepared in a metastable form and introduced into the waste stream in such a manner that the reagent is released from the solution and dispersed within the waste stream in the form of a very finely divided and microscopic gaseous phase. The reagent, in gaseous phase, is selectively absorbed on the surfaces of the suspended, dispersed or emulsified waste material to selectively react with the surfaces of the waste material and produce surface characteristics which induce agglomeration and coagulation of the waste material. Upon agglomerating and coagulating, the apparent density of the material is increased by the expulsion of liquid from within the waste material and by the reduction in apparent surface area for the waste material. The agglomerated and coagulated particles of waste material then settle out of the waste material stream and agglomerate and coagulate into large easily removed portions of waste material. Upon the removal of these portions, by decanting, filtration, centrifuging or the like a reasonably clear liquid remains which may be returned to the mill, plant or industrial facility for further use or the liquid may be flowed to and deposited in a river, lake or other by-water without any harmful or objectionable effect thereon provided the original mineral content of the liquid component is acceptable. The waste material may be accumulated, dried and optionally sterilized for further use as fertilizer, animal feed, or energy source for burning in the generation of power. In addition, it should be noted that the extracted waste material is capable of and useful for subsequent and further use as a surface active cationic flocculating agent in the treatment of waste material streams.

Suitable reagents include those compounds or compositions which may be spontaneously released from a liquid media as a gas to become attracted to a particulate surface in the liquid media upon which an activating reaction takes place. Preferred reagents include ammonia, hydrogen sulfide, halogen compounds, carbon dioxide, sulfur dioxide and ozone. A particularly preferred group of reagents include ammonia, chlorine, bromine and fluorine with especially superior results being achieved through the use of gaseous ammonia. In one embodiment, a supply of saturated ammonia solution, for example, saturated ammonia water, is prepared with the solution heated sufficiently to cause the chlorine to become and remain metastable. Temperatures from in excess of 80° C. to about 700° C. have been found to produce suitable results and are recommended for the operation of the process. Superior results have been achieved through the use of a temperature of about 85° C. to about 250° C. In addition, the supply of metastable saturated ammonia solution should be maintained in a pressure tight system with an increase in pressure maintained in the system over that pressure which is required to suppress premature release of the ammonia gas. Suitable pressures have ranged up to six atmospheres with superior results being achieved at a pressure of 2 atmospheres.

The metastable saturated ammonia solution is introduced into a waste material stream which is at a lower temperature and pressure than the ammonia solution. The shock created by this introduction, together with the differential between the pressures of the waste stream and ammonia solution and the reduction in partial pressure of ammonia, causes the ammonia gas to be released and dispersed throughout the waste stream in a gaseous phase of microscopic bubbles, i.e., microbubbles. The microbubbles generally are within the range of 3.72 angstrom units to 0.1 mm. in diameter and because of their small size quickly migrate and disperse throughout the waste stream. These microbubbles have a low tendency to coalesce or dissolve in the waste stream and therefore maintain substantially the same size as they travel through the liquid. Further, flow around each bubble is approximately laminar, lessening localized disturbances and mixing.

It is preferable that a short contact time be provided during which the microbubbles may be thoroughly dispersed throughout the waste stream. As each microbubble encounters particulate solid waste material, the bubble of ammonia gas is selectively adsorbed upon only the surface of the particulate material to selectively react with the material only at that point on the surface. The reaction produces an ammonium salt having a dipole charge at the point of adsorption. The dipole charge is sufficient to create a charged site on the surface thus causing that area of the surface to become a cationic flocculating agent. Thus, surface active cationic flocculating agents are produced in situ from waste material by this process.

The following are examples of reactions which occur at the surface of particulate waste material:

Phenol

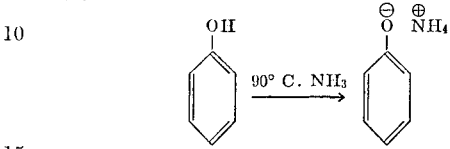

ortho-cresol

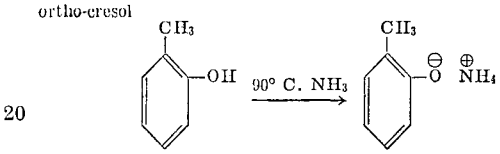

Pentachlorophenol

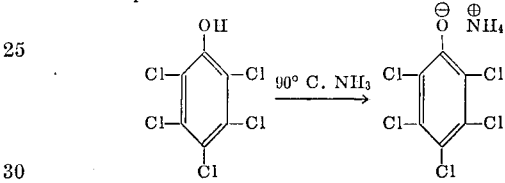

The areas of cationic flocculating agents on the surface of the waste material cause the waste material to agglomerate and coagulate. As previously disclosed, the agglomerated and coagulated waste material then settles out of solution and is easily removed by conventional mechanical separation.

Referring now more particularly to the drawing, it may be seen that the figure is a schematic diagram representing one waste removal system within the scope of the present invention. In this schematic diagram of the process, liquid influent from a source of waste material is pumped by an influent pump through a valve to the bottom of dispersion tank 10. Also entering the bottom of the dispersion tank is metastable saturated ammonia water solution. The ammonia water solution is prepared by combining ammonia gas with a heated water solution within a solution preparation tank. The temperature of the ammonia saturated water solution should be maintained at a level sufficient to cause the ammonia to be metastable. A suitable temperature for a water solution is 90° C. The ammonia gas is admitted to the solution preparation tank under pressure and an increase in pressure over the pressure required to repress release of the ammonia gas is maintained within the tank, suitably 2 atmospheres. As the heated metastable ammonia water solution is introduced into the bottom of the dispersion tank, the ammonia gas is released from the solution in the form of microbubbles. Foraminous baffles 12 within the dispersion tank assist gentle dispersion of the microbubbles throughout the waste material influent. In addition, the baffles cause the waste material influent together with the generated microbubbles to follow a tortuous path through the dispersion tank and establish a contact period between waste material and bubbles during which the microbubbles can be adsorbed on the particulate surfaces. Other equipment may be used in place of the baffles to assist the dispersion of the microbubbles if so desired.

From the top of the dispersion tank, water solution and coagulated and agglomerated waste material flow as an effluent through a valve to a separation station where the waste material may be easily and efficiently separated from the water solution by conventional mechanical techniques. As shown in the diagram, makeup water solution for use in preparing the saturated ammonia water solution may be withdrawn from the effluent and pumped by an effluent recycle pump to the solution preparation tank. The ammonia gas, as shown by the solid line 14 and the dotted line 16 may be added to the water solution either before or after heating of the water solution within the solution preparation tank.

A suitable range for amount of reagent to amount of waste-material influent is from about .05 gram reagent to about 1 gram reagent per 1000 cc. of waste material influent. Preferably the ratio for reagent ranges from about .10 gram to about .50 gram per 1000 cc. of waste; and particularly superior results are achieved when the ratio is from about .20 to about .40 gram per 1000 cc. of waste. As an example of the application of these ratios to waste material effluent streams, it has been found that with a typical waste stream from a rice processing facility approximately 2.03 pounds of ammonia is sufficient for treating approximately 1000 gallons of the waste material stream. It should be noted that since a reaction occurs only between the surface molecules of each waste material particle and the reagent, the amount of reagent required for effective coagulation and agglomeration is quite low when compared to prior art processes.

After the waste material has been removed from the effluent waste material stream, the remaining solution may be further treated to adjust its characteristics if such adjustment is desirable. The remaining solution, at optimum operation of the present process, contains very little dissolved ammonia or ammonia compounds and is generally suitable for discharge into rivers, lakes and by-waters without further treatment provided the original mineral content of the liquid component is acceptable.

An additional application of the present process concerns the processing of pulp, paper and pure cellulose from wood and wood chips. In conventional preparative procedures, the lignin present in the wood and wood chips is bleached in a costly and involved mechanical and chemical procedure which removes only a part of the lignin content. This step may be followed by the present process in a polishing operation wherein treatment of a solution of ground or comminuted wood or wood fibers with microbubbles of a reagent, such as chlorine, causes the agglomeration and coagulation of additional remaining lignin on the surfaces of the wood and wood fiber particles. The agglomerated and coagulated lignin may then be mechanically removed by conventional procedures. The process for formation of microbubbles of chlorine reagent may be by the preparation of a saturated metastable chlorine water solution as previously described for ammonia. It is found that surface active cationic areas of flocculating agent are created on the lignin particles causing them to agglomerate and coagulate sufficiently for mechanical removal. The remaining wood, wood fibers and cellulose fibers are suitable for further processing.

The present invention is further illustrated by the following examples.

EXAMPLE 1

A viscous sludge of cresol, phenolic acids, wood fiber and other contaminants of wood origin is taken from the bottom of a settling basin of a wood preserving plant and diluted with water to one part sludge per four parts water. The pH of this solution is measured at 4.0. A metastable ammonia water solution is prepared and heated to a temperature of about 90° C. in an air-tight solution preparation tank by mixing ammonia gas with distilled water. The ammonia solution is then gradually pumped under 2 atmospheres of pressure into the bottom of a dispersion tank, containing approximately 500 ml. of the waste solution at 20° C., until 0.15 gram of ammonia has been added. Microbubbles of ammonia gas forms within the dispersion tank and the waste material begins to agglomerate and coagulate as a precipitate soon thereafter. The waste solution is clear and is removed by decanting.

The supernatant liquid is found to have a pH of 6.8. The chemical oxygen demand (C.O.D.) is determined for the diluted waste solution and the supernatant liquid for comparison purposes. It is found that the diluted waste solution has a C.O.D. of 170,000 mg./l. and the treated supernatant liquid has a C.O.D. of 600 mg./l.

EXAMPLE 2

A quantity of paper mill waste is mixed with water to form a suspension and the larger particles separated therefrom, leaving a solution containing smaller particles. A 231 milliliter sample of the solution is found to have 0.27 gram of solids therein. A chlorine water solution is prepared at 200° C. and the sample of waste solution is treated therewith as in Example 1. A brown precipitate quickly forms at the bottom of the tank. The water remaining is found to be free of solids.

EXAMPLE 3

A solution of rice steep waste from a rice processing plant is pumped at 21.1° C. into the bottom of a dispersion tank at a rate of 500 cc. per minute. A metastable ammonia water solution is prepared in a preparation tank at a temperature of 99.8° C. and a pressure of 2 atmospheres. The metastable ammonia water solution is then pumped into the dispersion tank with the rice steep waste solution at a rate sufficient to add 0.12 gram of ammonia per minute. The flow of both reagent and rice waste continued and gave consistently coagulative results with sedimentation occurring in five minutes. Ninety-five percent of total solids are removed by gravitational sedimentation in fifteen minutes, total settleable solids in 45 minutes. The supernatant was then centrifuged to reduce the amount of fine suspended particles. The centrifuged supernatant is then flowed through an activated carbon bed to remove all color from the liquid.

The following results are obtained upon testing:

ANALYSIS OF RICE WASTE

| | Sample | | |
|---|---|---|---|
| | No. 1 | No. 2 | No. 3 |
| pH | 4.8 | 6.9 | 6.6 |
| Chemical oxygen demand, mg./l | 2,860 | 450 | |
| Biochemical oxygen demand, mg./l | | | 30 |

NOTE.—Sample No. 1—Rice waste, untreated; Sample No. 2—Rice waste, treated, gravitational sedimentation; Sample No. 3—Rice waste, treated, centrifuged.

EXAMPLE 4

A 100 ml. sample of dye waste solution including azo dyes, phenolphthalein, and methyl orange dye is found to have 0.0124 gram of solids therein. The sample is treated with a chlorine water solution as in Example 2. A white precipitate forms at the bottom of the dispersion tank. All visible solids are precipitated from the water.

EXAMPLE 5

A quantity of material is taken from a municipal sewage line and mixed with water to form a suspension. Several 100 milliliter samples are found to have an average of 0.1424 gram of solids therein. One sample of waste is treated with a chlorine solution prepared under conditions similar to Example 2 and a grey precipitate forms at the bottom of the dispersion tank. No visible waste remains in the water.

EXAMPLE 6

A quantity of material is taken from a portion of rendering plant sediment and mixed with water to form a suspension. A 419.3 milliliter sample of the suspension is found to have 10.675 grams of solids therein. A chlorine solution, prepared as in Example 2, is used to treat the sample under conditions similar to those of Example 2.

A greyish-brown precipitate forms at the bottom of the dispersion tank. No visible solids remain in the water.

EXAMPLE 7

A 100 milliliter sample of raw waste from a poultry packing plant is found to have 0.1922 gram of solids therein. The sample is treated with chlorine as in Example 2 under conditions similar to those of that example and a dark precipitate forms at the bottom of the tank. All visible solids are removed.

While this invention has been described in detail with particular reference to preferred embodiments thereof, it will be understood that variations and modifications can be effected within the spirit and scope of the invention as described hereinbefore and as defined in the appended claims.

I claim:

1. Process for coagulating and agglomerating particulate material within a liquid media comprising preparing an ammonia water solution at a temperature of about 80° C. to about 700° C. and under a pressure in excess of the pressure upon the liquid media, introducing the ammonia water solution at substantially said temperature and pressure into the liquid media, generating microbubbles of ammonia gas within the liquid media, adsorbing the microbubbles of ammonia gas on the surfaces of the particulate material, and reacting the ammonia gas with the particulate material at the points of adsorption.

2. Process for coagulating and agglomerating particulate material within a liquid media comprising the steps of:
   introducing into the liquid media a metastable solution containing a dissolved gas at a temperature of about 80° C. to about 700° C. and a pressure above that on the liquid media so that microbubbles of gas are formed within the liquid media;
   adsorbing the microbubbles of gas on surfaces of the particulate material; and
   reacting the gas with the particulate material at the points of adsorption to produce areas of surface characteristics which induce agglomeration and coagulation of the particulate material.

3. Process for coagulating and agglomerating particulate material within a liquid media comprising the steps of:
   introducing a solution containing a dissolved gas into the liquid media under a pressure in excess of the pressure on the liquid media and at a temperature of from about 80° to about 700° C. so that microbubbles of the gas form within the liquid media, said microbubbles being of a diameter between about 3.72 Angstrom units and 0.1 millimeters;
   adsorbing the microbubbles of the gas on areas of the surfaces of the particulate material, said areas of surface constituting less than the total surface area of the particulate material;
   reacting the gas with the surface molecules of the particulate material at the points of adsorption to produce areas of surface characteristics which induce agglomeration and coagulation of the particulate material.

4. Process of claim 1 wherein the ammonia water solution is prepared at a temperature of about 85° C. to about 250° C.

5. Process of claim 2 wherein the gas is selected from the group consisting of ammonia, chlorine, ozone, carbon dioxide, bromine, iodine and fluorine.

6. Process of claim 2 wherein the gas is ammonia.

7. Process of claim 3 wherein the gas is selected from the group consisting of ammonia, chlorine, ozone, carbon dioxide, bromine, iodine and fluorine.

8. Process of claim 3 wherein the gas is ammonia.

9. Process of claim 2 wherein lignin is the particulate material and the particulate material is extracted from wood fibers during a papermaking process.

10. Process of claim 9 wherein the gas is selected from the group consisting of ammonia, chlorine, ozone, carbon dioxide, bromine, iodine, and fluorine.

References Cited

UNITED STATES PATENTS

| | | | |
|---|---|---|---|
| 3,586,627 | 6/1971 | Gooch | 210—47 |
| 3,235,491 | 2/1966 | Rosenberg et al. | 210—52 |
| 3,374,081 | 3/1968 | Miller | 210—54 X |

MICHAEL ROGERS, Primary Examiner

Disclaimer 3,733,269.—*Jan W. Gooch*, Russellville, Ark. PROCESS FOR COAGULATING AND AGGLOMERATING PARTICULATE MATERIAL WITHIN A LIQUID MEDIA. Patent dated May 15, 1973. Disclaimer filed Apr. 25, 1972, by the inventor.

Hereby disclaims the portion of the term of the patent subsequent to June 22, 1988.

[*Official Gazette September 11, 1973.*]